United States Patent
Kallioinen et al.

(10) Patent No.: US 10,080,372 B2
(45) Date of Patent: Sep. 25, 2018

(54) LOW-LACTOSE AND LACTOSE-FREE MILK PRODUCT AND PROCESS FOR PRODUCTION THEREOF

(75) Inventors: Harri Kallioinen, Haarajoki (FI); Reetta Tikanmäki, Espoo (FI)

(73) Assignee: VALIO LTD., Helsinki (FI)

( * ) Notice: Subject to any disclaimer, the term of this patent is extended or adjusted under 35 U.S.C. 154(b) by 1152 days.

(21) Appl. No.: 12/201,620

(22) Filed: Aug. 29, 2008

(65) Prior Publication Data

US 2010/0055289 A1 Mar. 4, 2010

(51) Int. Cl.
| | |
|---|---|
| A23C 9/20 | (2006.01) |
| A23C 9/18 | (2006.01) |
| A23C 9/12 | (2006.01) |
| A23C 9/142 | (2006.01) |

(52) U.S. Cl.
CPC .......... *A23C 9/1206* (2013.01); *A23C 9/1422* (2013.01)

(58) Field of Classification Search
CPC .......................... A23C 9/1206; A23C 9/1422
See application file for complete search history.

(56) References Cited

U.S. PATENT DOCUMENTS

| | | | |
|---|---|---|---|
| 6,288,222 B1 * | 9/2001 | Roth et al. | 536/127 |
| 6,875,459 B2 | 4/2005 | Kopf et al. | |
| 2004/0040448 A1 * | 3/2004 | Dunker et al. | 99/452 |
| 2005/0214409 A1 * | 9/2005 | Tossavainen et al. | 426/34 |
| 2007/0166447 A1 * | 7/2007 | Ur-Rehman et al. | 426/580 |

FOREIGN PATENT DOCUMENTS

| | | | |
|---|---|---|---|
| EP | 250623 A1 * | 1/1988 | |
| EP | 0 226 035 B1 | 7/1990 | |
| JP | 2002000291 A | 1/2002 | |
| KR | 2004103818 A * | 12/2004 | |
| KR | 20040103818 | 12/2004 | |
| WO | WO 00/45643 | 10/2000 | |
| WO | WO 01/60171 A1 | 8/2001 | |
| WO | WO 0193689 A1 * | 12/2001 | ........... A23C 9/1422 |
| WO | WO2001093689 A1 * | 12/2001 | |

(Continued)

OTHER PUBLICATIONS

Eckner, KF and Zottola, EA. Partitionaing of Skim Milk Components as a Function of pH, Acidulant, and Temperature During Membrane Processing. Journal of Dairy Science (1992) 75(8):2092-2097 (abstract).*

(Continued)

*Primary Examiner* — Emily M Le
*Assistant Examiner* — Subbalakshmi Prakash
(74) *Attorney, Agent, or Firm* — Nixon & Vanderhye P.C.

(57) ABSTRACT

The invention relates to a process for separating milk components, wherein proteins, sugars and minerals are separated into different fractions. The lactose of milk is first hydrolyzed completely or partially, after which proteins, minerals and sugars are separated into fractions in a phased nanofiltration. The obtained fractions may also be further processed by chromatography, membrane techniques, and/or evaporation to further improve the separation of said components. The invention also relates to a low-lactose or lactose-free milk composed of these fractions. By means of the invention, calcium and protein losses can be minimized. Also, the energy content of the product can be reduced.

12 Claims, 1 Drawing Sheet

(56) References Cited

FOREIGN PATENT DOCUMENTS

| WO | WO 03/094623 A1 | 11/2003 |
| WO | WO 2004/019693 A2 | 3/2004 |
| WO | WO 2006/087409 A1 | 8/2006 |
| WO | WO 2007/076873 A1 | 7/2007 |
| WO | WO 2009/000972 A1 | 12/2008 |
| WO | WO 2009/043877 A1 | 4/2009 |

OTHER PUBLICATIONS

Sarney, DB; Hale, C; Frankel, G and Vulson, EN. A novel approach to the recovery of biologically active oligosaccharides from milk using a combination of enzymatic treatment and ultrafiltration. Biotechnology and Bioengineering (2000) 69(4):461-467.*

Pruksasri, Suwattana Production and separation of galactooligosaccharides from lactose by β-galactosidase immobilized on nanofiltration membranes.Thesis abstract, Ohio State University 2007 http://etd.ohiolink.edu/view.cgi?acc_num=osu1190137539 accessed Apr. 18, 2013.*

Harju, Matti. Milk sugars and minerals as ingredients. International Journal of Dairy Technology, vol. 54, No. 2 May 2001.*

S. H. Choi, S.-B. Lee and H.-R. Won Development of Lactose-hydrolyzed Milk with Low Sweetness Using Nanofiltration Asian-Aust. J. Anim. Sci. vol. 20, No. 6 : 989-993 Jun. 2007.*

International Search Report dated Sep. 17, 2010 in PCT/FI2009/050678.

Written Opinion dated Sep. 17, 2010 in PCT/FI2009/050678.

Choi et al, "Development of Lactose-hydrolyzed Milk with Low Sweetness Using Nanofiltration", Asian-Aust. J. Anim. Sci, vol. 20, No. 6: 989-993, Jun. 2007.

Sarney et al, "A Novel Approach to the Recovery of Biologically Active Oligosaccharides . . . ", Biotechnology and Bioengineering, vol. 69, No. 4, 461-467, Aug. 20, 2000.

Official Action and English translation in Russian Application No. 2011111399 dated Jun. 18, 2013.

Chinese Office Action and English language translation in CN 200980133029.4 dated Oct. 27, 2014.

Russian Office Action and English translation in Appln. SN 201111139/10(016834) dated Jun. 6, 2014.

Korean Office Action issued in App. No. 10-2016-7024801 dated Sep. 21, 2016 (w/translation).

Lahoul, "Tech Brief: Membrane Filtration" National Drinking Water Clearing-house (NDWC), pp. 1-8 (Mar. 1999).

Third Party Observations submitted in EP Appln. No. 09784164.7 forwarded by the EPO dated Feb. 9, 2018.

* cited by examiner

LOW-LACTOSE AND LACTOSE-FREE MILK PRODUCT AND PROCESS FOR PRODUCTION THEREOF

FIELD OF THE INVENTION

The invention relates to a process for separating milk components into individual components, and a low-lactose or lactose-free milk composed of these components. The invention relates particularly to using nanofiltration technology in the separation of milk components.

BACKGROUND OF THE INVENTION

Several processes for producing low-lactose and lactose-free milk by using membrane techniques are known. A conventional enzymatic process for splitting lactose is also generally known in the field, the process comprising the step of adding lactase from fungus or yeast into milk in such a manner that lactose is split into monosaccharides, i.e. glucose and galactose, in over 80%.

Several membrane filtration process solutions have been presented for removing lactose from milk raw material. Four basic membrane filtration processes are generally used: reverse osmosis (RO), nanofiltration (NF), ultrafiltration (UF), and microfiltration (MF). Of these, UF is mainly suitable for separating lactose from milk. Reverse osmosis is generally applied to concentration, ultra- and microfiltration to fractionation, and nanofiltration to both concentration and fractionation. A lactose removal process based on a membrane technique is described in WO publication 00/45643, for instance, wherein lactose is removed by ultrafiltration and diafiltration.

It is known in the field that a problem with membrane techniques in general is that during ultrafiltration not only lactose is removed from the milk, but also some of the minerals that are significant for the taste of milk and milk products prepared thereof. Controlling the mineral content and especially bivalent minerals, such as calcium and magnesium, is particularly problematic in the field, and extensive loss results from the known processes, which is why these bivalent minerals must often be returned or added separately.

Often membrane processes also produce, for instance, mineral-containing secondary flows, which cannot be exploited efficiently and which also increase waste water load, require further processing and add to the costs. It would thus be useful to provide processes, by which bivalent minerals in particular may be controlled in the process and recovered more efficiently, thus allowing the circulation of process waters without producing secondary flows.

WO publication 03/094623 A1 discloses a process in which a milk product is ultrafiltered, nanofiltered, and concentrated by reverse osmosis, after which the minerals removed during ultrafiltration are returned to the UF retentate. The residual lactose of the thus obtained low-lactose milk product is hydrolyzed with a lactase enzyme into monosaccharides, whereby an essentially lactose-free milk product is obtained. With this process, lactose is removed from milk without affecting the organoleptic properties of the milk product being prepared. In this process, the loss of bivalent minerals, such as calcium and magnesium, may be significant. Also, the process produces minerals containing secondary flows, which cannot be utilized in the process and which require post-processing. To solve these problems, simpler and more efficient alternative processes are needed.

Lactose can also be specifically separated from milk by chromatography. However, many problems differing from the processing of whey are associated with the processing of milk, such as easy precipitation of casein, maintaining the micellar structure of casein, behaviour of fat, and extremely strict hygiene requirements. For instance EP publication 226035 B1 describes a lactose separation process in which milk is fractionated in such a manner that the lactose fraction is separated and the minerals are in the protein fraction or protein-fat fraction. The process is characterized by balancing cation exchange resin by making its cation composition correspond to that of milk, and milk is separated chromatographically in a column with the balanced cation exchange resin at a temperature of approximately 50 to 80° C. by using water in elution. An advantage of the process is that all compounds essential to taste remain in the milk. However, chromatographic lactose separation is a slow and complex process that cannot be directly applied to conventional dairies without expensive equipment investments. Another problem is a high consumption of water and a large amount of chemicals.

Patent publication KR20040103818 describes a process for the production of low-lactose milk, comprising nanofiltering milk hydrolyzed with lactase to partly remove galactose and glucose, and adding water into the nanofiltration retentate to achieve a suitable sweetness. Choi et al. (Asian-Aust. J. Anim. Sci 20 (6) (2007) 989-993) describe a process for the production of lactose-hydrolyzed milk, wherein raw milk is hydrolyzed with β-galactosidase (5 000 lactase activity unit/g, Validase, Valley Research) partly (0.03%, 4° C., 24 hours) or 'completely' (0.1%; 40 h), heat-treated to inactivate the enzyme (72° C., 5 min), cooled to 45 to 50° C., and nanofiltered at a pressure of approximately 9 to 10 bars (130 to 140 psi; concentration factor 1.6) Water was added into the NF retentate and the heat treatment was performed at 65° C. for 30 min. The lactose-hydrolyze milk consisted of protein (3.1%), fat (3.5%), lactose (0.06%) glucose (1.45%), and galactose (1.29%). In the processes described in said publications and comprising a single-phase nanofiltration, all of the monovalent minerals are not yet returned to milk efficiently enough.

WO publication 2007/076873 describes low-carbohydrate milk containing essentially all of the calcium and protein of the original milk, and a process for the production thereof. In this process, the pH of milk is adjusted to an alkaline value of 7.0 to 9.5, the milk is ultrafiltered, the UF permeate is nanofiltered preferably at a temperature of approximately 10° C. to minimize the microbiological risk, the NF permeate, UF retentate and water are combined, and the pH is adjusted to the pH value of the original milk (pH 6.7) by adding acid, preferably citric acid or phosphoric acid. The energy content of the product is 90 to 250 kJ/100 g. The process comprises a plurality of steps and requires strong chemicals to adjust the pH and to minimize the calcium and protein loss.

WO publication 2004/019693 describes a process for separating different components with membrane techniques (ultrafiltration, nanofiltration and reverse osmosis) and combining these components into milk products, such as ice cream, yogurt and milk drink.

It is also known to use milk after lactose removal as a raw material in the production of low-carbohydrate dairy products. For instance WO publication 2006/087409 A1 describes a low-energy skim milk drink rich in added calcium, containing a low-energy milk base, which consists of skim milk or a whey protein solution or a mixture thereof and from which carbohydrates have been removed either completely or partly by ultrafiltration or chromatography according to the previously known processes. The energy content of the product is 20 kcal/100 g at most.

Recent studies have concentrated on membrane filtration of milk and on the use of such filtered, low-carbohydrate milk in the preparation of dairy products, such as cheese, ice cream and yogurt. Common to the known multi-step membrane filtration processes comprising several different processes, one sub-phase of which is nanofiltration, for preparing low-carbohydrate milk products is that residual lactose is not removed from the milk raw material until it has undergone membrane filtration.

It is very challenging to achieve products that are completely flawless in taste and structure, that meet the consumers' expectations on an organoleptically competent milk product, and that are produced economically and simply without losing polyvalent minerals.

A process for the production of low-lactose and lactose-free milk products that are completely flawless in their organoleptic properties without any extra costs has now been unexpectedly invented. The process of the invention makes it possible to control bivalent minerals more efficiently and simpler than in conventional processes without any extra costs, and allows to minimize losses. In addition, the process of the invention does not produce secondary flows requiring post-processing, which makes the process more efficient.

BRIEF DESCRIPTION OF THE INVENTION

The present invention provides a new solution for avoiding calcium and protein losses that have proven problematic in the production of both low-lactose and lactose-free and low-carbohydrate milk products and problems associated with organoleptic properties, especially the taste, of such milk products by providing a process comprising hydrolyzing the lactose of a milk raw material, separating proteins, sugars and minerals from the obtained, hydrolyzed milk raw material into different fractions by phasing nanofiltration conditions according to membrane type, temperature, pressure and/or diawater addition, and also applying membrane techniques and/or chromatographic separation processes in a feasible further separation. From the separated fractions, a desired milk product can be prepared.

As an aspect, the invention provides a process for separating milk components into individual components, the process being characterized by what is stated in the independent claim. The invention also provides a lows lactose and a lactose-free milk product, which are made from these components, and a process for the production of such a milk product. With the process of the invention, it is possible to simplify and enhance the production of low-lactose and lactose-free milk products, whereupon the loss of especially bivalent minerals, particularly calcium and magnesium, is minimized and minerals and/or protein need not be supplemented/added separately.

All by-products obtained as a result of the process according to the invention are common dairy products and the secondary flows produced in the process can be further exploited in the process of the invention. The process does not lead to products or secondary flows, which should be processed or separated in an exceptional way, which means that the waste water load is minimized.

In addition, protein and mineral losses typical of lactose-free and low-lactose milk products in particular are avoided, and especially the recovery of bivalent minerals becomes more effective.

The invention also provides a process that is simple, economic, industrially applicable on a large scale, and does not cause additional costs.

It was unexpectedly found that by hydrolyzing the lactose of a milk raw material completely or partly and phasing the nanofiltration of the hydrolyzed milk raw material in at least two different nanofiltration conditions, such as at a temperature and/or pressure, and/or by adding diawater, and/or with at least two different nanofiltration membrane types, the loss of minerals was minimized and the ratio between calcium and protein was controlled efficiently. The invention thus provides a process for separating the milk raw material components of hydrolyzed skim milk by benefiting from different permeability properties of nanofiltration membranes and different process conditions. A condition change may occur immediately or steadily or step by step at a certain speed, whereby the desired change/changing phase in the condition profile may also be understood as one sub-phase.

A milk product produced with the process of the invention has desired organoleptic properties, contains little carbohydrates, and contains a comparable amount of calcium as normal milk.

DETAILED DESCRIPTION OF THE INVENTION

As an aspect, the invention relates to a process for separating milk components, the process being characterized by a) hydrolyzing the lactose of a milk raw material, thus obtaining hydrolyzed milk raw material, and b) performing a phased nanofiltration for the hydrolyzed milk raw material in at least two sub-phases, thus obtaining two or more NF retentate fractions NF Ret I, NF Ret II, NF Ret III, etc. and two or more NF permeate fractions NF Perm I, NF Perm II, NF Perm III, etc. to separate proteins, sugars and minerals into these different fractions.

In the context of the present invention, a milk raw material refers to milk, whey, and combinations of milk and whey. The milk raw material may be supplemented with ingredients generally used in the preparation of milk products, such as fat, protein or sugar fractions, or the like. The milk raw material may thus be, for instance, full-fat milk, cream, low-fat milk or skim milk, ultrafiltered milk, diafiltered milk, microfiltered milk, or recombined milk from milk powder, organic milk or a combination of these. Preferably the milk raw material is skim milk.

In step a) of the process of the invention, the lactose of the milk raw material is hydrolyzed into monosaccharides, as is known in the field. In an embodiment of the process according to the invention, the hydrolysis is performed in its entirety (complete hydrolysis) prior to phased nanofiltration. In a second embodiment of the process of the invention, the hydrolysis is performed partly before the phased nanofiltration, and partly the rest of the lactose of the hydrolyzed milk raw material is post-hydrolyzed, essentially simultaneously with the phased nanofiltration of the hydrolyzed milk raw material. In a preferred embodiment of the invention, the post-hydrolysis is performed in the first sub-phase of the nanofiltration.

Complete hydrolysis means that the lactose content of the hydrolyzed milk raw material is less than 0.5%. Partial hydrolysis means that the lactose content of the hydrolyzed milk raw material is more than 0.5%.

In step b) of the process of the invention, the hydrolyzed milk raw material obtained in the previous step a) undergoes a phased nanofiltration to separate proteins, sugars and minerals into different fractions in the context of the present invention, a phased nanofiltration means that nanofiltration comprises at least two sub-phases. Each sub-phase is carried out under different process conditions and/or by using different membrane types. A variable condition may be, for instance, filtration temperature, filtration pressure, diawater addition, and/or concentration factor of filtration. In each sub-phase, conditions can be changed with regard to one or more variables. A condition change may happen immediately or steadily or step by step at a certain speed, whereby the desired change/changing phase in the condition profile refers to a sub-phase. In an embodiment of the invention, the phased nanofiltration comprises a change in temperature conditions and/or membrane type. In a second embodiment of the invention, the nanofiltration is combined with diafiltration (DF), wherein diawater is added into the nanofiltration retentate in at least one sub-phase of nanofiltration.

The phased nanofiltration of the invention, comprising at least two sub-phases, produces two or more nanofiltration, i.e. NF, retentates, which are marked with NF Ret I, NF Ret II, NF Ret III, etc. in the following, and two or more nanofiltration, i.e. NF, permeates, which are marked with NF Perm I, NF Perm II, NF Perm III, etc. in the following. The serial number refers to the number of nanofiltration sub-phases carried out in the process. Thus NF Ret I refers to a retentate obtained in the first sub-phase of nanofiltration NF Ret II refers to a retentate obtained in the second sub-phase of nanofiltration NF Ret III refers to a retentate obtained in the third sub-phase of nanofiltration, etc.

NF Perm I refers to a permeate obtained in the first sub-phase of nanofiltration NF Perm II refers to a permeate obtained in the second sub-phase of nanofiltration NF Perm III refers to a permeate obtained in the third sub-phase of nanofiltration, etc.

In an embodiment of the invention, the NF retentate and NF permeate fractions obtained from the phased nanofiltration are further processed by membrane techniques and/or by chromatography to further improve the separation of proteins, sugars and minerals. Further processing may concern either one or more NF retentates or NF permeates. A membrane technique particularly suitable to be used in further processing is reverse osmosis (RO). In the following, RO Ret refers to a retentate obtained by reverse osmosis, and RO Perm refers to a permeate obtained by reverse osmosis.

Different separation processes may also be combined as desired in one or more phases. In an embodiment of the invention, the protein, sugars and minerals of the hydrolyzed milk raw material are separated by membrane techniques, by performing a phased nanofiltration preferably in the first phase under conditions, in which monosaccharides are retained in the retentate to a low extent, and in the second phase under conditions, in which monosaccharides are retained in the retentate to a high extent. In a specific embodiment of the invention, the phased nanofiltration is performed in the first phase in warm conditions, at approximately 42 to 51° C., and in the second phase in cold conditions, at approximately 10 to 18° C. According to a second embodiment of the invention, the nanofiltration may alternatively be performed first in cold conditions and then in warm conditions. In membrane techniques, usually a temperature of for instance 10° C. is known to be used as an industrial process temperature to avoid microbiological problems.

Suitable nanofiltration membranes include, for instance, Desal 5 DL (GE Osmonics, USA), Desal 5 DK (GE Osmonics, USA), TFC® SR3 (Koch membrane systems, Inc., USA), FILMTEC™ NF (Dow, USA). Suitable reverse osmosis membranes include, for instance, TFC® HR (Koch membrane systems, Inc., USA) and FILMTEC FT30 (Dow, USA).

In an embodiment of the invention, a further chromatographic separation is performed for one or more NF retentates. In a preferred embodiment of the invention, the separation is performed for the retentate obtained in the second sub-phase of nanofiltration.

A concentration factor (K) refers to the weight ratio between the liquid to be fed to the filtration and the retentate, and it is determined by the following formula:

$$K=\text{feed (kg)/retentate (kg)}$$

In the process of the invention, preferably a concentration factor K=1 to 10, more preferably K=2 to 6, is used in the nanofiltration. If diafiltration is employed in the phased nanofiltration according to the invention, the concentration factor may be considerably bigger.

The process of the present invention may be applied to both batch and continuous production. Preferably, the process of the invention is performed as a batch process.

In a specific embodiment of the process according to the invention, wherein the phased nanofiltration of lactose-hydrolyzed skim milk is carried out by performing the first phase in warm conditions (K=3) and nanofiltering the NF permeate (NF Perm I) obtained in the first phase in cold conditions (K=6) in the second phase to recover minerals, the NF retentate of the first nanofiltration phase (NF Ret I) contains glucose 2.5%, galactose 2.5%, and ash 1.4% and has a dry matter content of 15.5%, and the permeate of the second nanofiltration phase (NF Perm II) contains glucose 0.2%, galactose 0.2%, and ash 0.2% and has a dry matter content of 0.5%. By composing a lactose-free milk of said NF retentate (21.3%), said NF permeate (35.4%), and the hydrolyzed skim milk (43.2%), a product with desired organoleptic properties could be obtained. The amount of calcium was exactly the same as in the original milk (1100 mg/kg). The milk contained 3.3% protein, 1.6% glucose, 1.6% galactose, 0.7% ash, and had a dry matter content of 7.3%. This embodiment of the invention will be described in example 3, and the composing of the milk from said fractions will be illustrated in example 8.

In a second specific embodiment of the process according to the invention, wherein reverse osmosis was performed after the phased nanofiltration and diafiltration, the second sub-phase of the nanofiltration provided an NF permeate II containing glucose 0.7%, galactose 0.7%, and ash 0.2% and having a dry matter content of 2.0%, and, respectively, an NF retentate II (K=3) containing glucose 3.1%, galactose 3.1%, and ash 1.1% and having a dry matter content of 14.4%. The milk composed of said NF retentate and RO retentate of the hydrolyzed skim milk (50:50) corresponded to normal milk in other respects except for the carbohydrates (protein 3.3%, glucose 1.7%, galactose 1.6%, ash 0.7%, dry matter 7.5%, calcium 1100 ml/kg). This embodiment of the invention will be described in example 2, and the composing of the milk from said fractions in example 6.

Fractions obtained by the process of the invention may be used particularly for producing lactose-free skim milk with desired organoleptic properties, the composition of which corresponds to that of the hydrolyzed milk, with the exception of carbohydrates, by combining the NF retentate I (K=1.5) (66.6%) of the first nanofiltration phase of the hydrolyzed skim milk, the NF permeate II (27.7%) of the second nanofiltration phase, and the mineral fraction (5.7%) separated in a chromatography column. The amount of calcium was exactly the same as in the original milk (1100 mg/kg). The milk contained protein 3.3%, glucose 1.6%, galactose 1.6%, ash 0.7%, and had a dry matter content of 7.5%. The composing of this milk will be described in example 7.

As a second aspect, the invention thus relates to a lactose-free or low-lactose milk product comprising at least one NF retentate fraction NF Ret I, NF Ret II, NF Ret III, etc. or NF permeate fraction NF Perm I, NF Perm II, NF Perm III, etc., which are obtained by nanofiltration of the hydrolyzed milk raw material, comprising at least two sub-phases.

In a second embodiment of the invention, the milk product is produced by combining two or more of the fractions: NF Ret I, NF Ret II, NF Ret III, etc., NF Perm I, NF Perm II, NF Perm III, etc., RO Ret, RO Perm, and a chromatographically separated mineral and/or sugar-containing fraction of NF Ret I, NF Ret II, NF Ret III, etc.

The lactose-free or low-lactose milk product of the invention can be liquid or in the form of a concentrate or powder.

As an aspect, the invention also relates to a process for the production of lactose-free or low-lactose milk product, the process comprising a) hydrolyzing the lactose of a milk raw material, thus obtaining hydrolyzed milk raw material, and b) performing a phased nanofiltration for the hydrolyzed milk raw material in at least two sub-phases, thus obtaining two or more NF retentate fractions NF Ret I, NF Ret II, NF Ret III, etc., and two or more NF permeate fractions NF Perm I, NF Perm II, NF Perm III, etc. to separate proteins, sugars and minerals into these different fractions, c) further processing, if desired, one or more of the fractions NF Ret I, NF Ret II, NF Ret III, etc. and NF Perm I, NF Perm II, NF Perm III, etc. by a membrane technique, and/or evaporation, and/or chromatography, d) composing a product with a desired composition from one or more of the fractions obtained from step b) and, if desired, from one or more fractions obtained from step c) and possibly other ingredients, e) if desired, concentrating the product obtained from step d) to a concentrate or a powder.

The milk product according to the present invention is a low-lactose or lactose-free product. In the present invention the term low-lactose means that the lactose content of the milk product is not more than 1.0%. The term lactose-free means that the milk product does not contain lactose more than 0.5 g/serving (e.g. 0.5 g/244 g for liquid milks, the lactose content being 0.21% at most), however, not more than 0.5%. In accordance with the invention, it is also possible to produce low-carbohydrate milks with flawless organoleptic properties. In addition, the loss of calcium and protein contained in the milk raw material is minimized and a separate supplementation/addition of minerals and/or protein is not necessary.

The following examples illustrate the invention but do not limit the invention to the embodiments mentioned.

Example 1: Single-Phase Nanofiltration of Hydrolyzed Skim Milk with Desal 5 DL Membrane (K=3)

Skim milk (20 l) was hydrolyzed (9° C., 18 h) by Godo YNL2 lactase (Godo Shusei Company, Japan) with a dosage of 0.08% and nanofiltered with a Desal 5 DL membrane (GE Osmonics, USA) at a temperature of 10 to 18° C. and a pressure of 12 to 21 bar. The permeate flow was 5.7 to 9.6 l/m$^2$h. The nanofiltration was continued until the concentration factor was 3 and the retentate volume 6.7 l and the permeate volume 13.3 l.

Samples were taken from the feed, which consisted of hydrolyzed skim milk, obtained NF retentate and NF permeate, and protein, dry matter, glucose, galactose, ash, and calcium were determined on the basis of the samples (table 1).

TABLE 1

| Nanofiltration retentate and permeate compositions | | | |
|---|---|---|---|
| Composition | Feed (hydrolyzed skim milk) | NF retentate I | NF permeate I |
| Protein (%) | 3.4 | 8.7 | 0.1 |
| Ash (%) | 0.8 | 1.5 | 0.2 |
| Calcium (mg/kg) | 1100 | 3000 | 23 |
| Dry matter (%) | 8.8 | 19.6 | 1.9 |
| Glucose (%) | 2.3 | 4.4 | 0.9 |
| Galactose (%) | 2.2 | 4.5 | 0.8 |
| Ca/protein (g/kg) | 32.5 | 34.5 | |

On the basis of the results it can be stated that in practice, calcium was not lost to the permeate but it remained in the same fraction as protein (table 1). In addition, monosaccharides permeate through the membrane to a great extent. When the retentate was diluted to the original protein content of the milk, the taste was considered "empty", i.e. untypical of milk. The reason for this are the minerals of the milk which were lost to the permeate during nanofiltration, providing the milk with an important property of salty taste. Thus, by nanofiltering hydrolyzed milk only in one phase, it is not possible to produce lactose-free or low-lactose milk tasting like normal milk.

Example 2: Three-Phase Nanofiltration (Membrane Desal DK+Diafiltration and Membrane Filmtec NF) of Hydrolyzed Skim Milk Combined with RO Filtration 0.06% of Godo YNL2 lactase (Godo Shusei Company, Japan) was added into skim milk (20 l) and hydrolyzed for 18 h at 10° C. The residual lactose content of the skim milk was then 0.03%. The thus obtained hydrolyzed skim milk was nanofiltered at 10 to 15° C. The filtration membrane was Desal 5 DK (GE Osmonics, USA) and the pressure was 13 to 19 bar, the permeate flow being 8.4 to 10.5 l/m$^2$h. The hydrolyzed skim milk was first filtered with a concentration factor 2, which means that an amount of 10 l of permeate altogether was removed from the apparatus. This was followed by diafiltration, i.e. diawater (5 l) was added to the NF retentate I (10 l) at the same speed at which NF permeate II was produced. The permeate from the first nanofiltration phase and the permeate obtained from the diafiltration were recovered and combined. The combined permeate fraction is called an NF permeate II in the following.

Samples were taken from the feed, which was hydrolyzed skim milk, NF permeate II and retentate obtained from the diafiltration, called an NF retentate II in the following, and protein, dry matter, glucose, galactose and ash and calcium were determined from the samples (table 2). After 4 hours, the lactose content of the NF retentate was <0.01%, so the hydrolysis continued during and after the nanofiltration.

TABLE 2

First nanofiltration of hydrolyzed skim milk combined with diafiltration. Feed, retentate and permeate compositions. In addition to the volumes in the table, an amount of 5 l of diawater was fed into the apparatus.

|  | Feed (hydrolyzed skim milk) | NF retentate II | NF permeate II |
|---|---|---|---|
| Volume (l) | 20 | 10 | 15 |
| Composition |  |  |  |
| Protein (%) | 3.4 | 6.5 | 0.1 |
| Ash (%) | 0.7 | 1.1 | 0.2 |
| Calcium (mg/kg) | 1100 | 2100 | 30 |
| Magnesium (mg/kg) | 110 | 200 | <10 |
| Dry matter (%) | 9.0 | 14.4 | 2.0 |
| Glucose (%) | 2.3 | 3.1 | 0.7 |
| Galactose (%) | 2.2 | 3.1 | 0.7 |
| Ca/protein (g/kg) | 32.5 | 33.0 |  |

The experiment was continued in the third sub-phase by nanofiltering the NF permeate II with a concentration factor 10 by Filmtec NF membranes (Dow, USA) at a filtration temperature of 10 to 20° C. The permeate flow was 5.3 to 9.4 l/m$^2$h and the pressure 10 to 21 bar.

The obtained NF permeate III was further concentrated by reverse osmosis (Filmtec RO-390-FF, Dow, USA) at room temperature (about 25° C.) with a concentration factor 1.35.

On the basis of the NF permeate III and the NF retentate III and the RO retentate I, dry matter, glucose and ash were determined. The results are shown in table 3.

TABLE 3

Second nanofiltration of hydrolyzed skim milk and concentration by reverse osmosis. Feed, retentate and permeate compositions.

|  | Feed (NF permeate II) | NF retentate III | NF permeate III | RO retentate I |
|---|---|---|---|---|
| Volume (l) | 15 | 1.5 | 13.5 | 10 |
| Composition |  |  |  |  |
| Dry matter (%) | 2.0 | 15.3 | 0.5 | 0.7 |
| Glucose (%) | 0.7 | 6.9 | 0.1 | 0.2 |
| Galactose (%) | 0.7 | 6.4 | 0.1 | 0.2 |
| Ash (%) | 0.2 | 0.7 | 0.2 | 0.2 |

The second-phase retentate (NF retentate II; table 2) and the RO retentate (table 3) were used in composing a milk (example 6). The RO permeate can also be used in composing a milk.

Example 3: Two-Phase Nanofiltration (Membranes Desal 5 DL (K=3) and Filmtec NF (K=6)) of Hydrolyzed Skim Milk The phased nanofiltration of lactose-hydrolyzed skim milk was tested by performing the first phase in warm conditions, and nanofiltering in the second phase the NF permeate I obtained in the first phase in cold conditions to recover the minerals.

As described above, skim milk (40 l) was hydrolyzed (9° C., 18 h) with Godo YNL2 lactase (Godo Shusei Company, Japan) with a dosage of 0.08%. The hydrolyzed skim milk was nanofiltered at a temperature of 47 to 51° C. The filtration membrane was Desal 5 DL (GE Osmonics, USA). The pressure was increased to keep the flow constant. During the experiment, the permeate flow was 8.1 to 9.6 l/m$^2$h and the pressure 4 to 6.4 bar. The filtration was continued until the concentration factor was 3.

Samples were taken from the feed, retentate and permeate and protein, dry matter, glucose, galactose and ash and calcium were determined on the basis of the samples (table 4).

TABLE 4

First nanofiltration of hydrolyzed skim milk. Feed, retentate and permeate compositions.

| Composition | Feed (hydrolyzed skim milk) | NF retentate I | NF permeate I |
|---|---|---|---|
| Protein (%) | 3.4 | 8.5 | 0.2 |
| Ash (%) | 0.8 | 1.4 | 0.3 |
| Calcium (mg/kg) | 1200 | 2900 | 40 |
| Dry matter (%) | 8.9 | 15.7 | 4.6 |
| Glucose (%) | 2.3 | 2.5 | 1.8 |
| Galactose (%) | 2.2 | 2.5 | 1.7 |
| Ca/protein (g/kg) | 35.1 | 34.2 |  |

The NF permeate I (20 l) of hydrolyzed skim milk was further nanofiltered with a concentration factor 6, as a result of which NF retentate II and NF permeate II were obtained. The nanofiltration membrane was Filmtec NF (Dow, USA) and the filtration temperature was 10 to 25° C. The permeate flow was 4.3 to 9.6 l/m$^2$h and the filtration pressure 10 to 26 bar.

Samples were taken from the feed (NF permeate I), NF retentate II and NF permeate II, and protein, dry matter, glucose, galactose and ash were determined on the basis of the samples (table 5).

TABLE 5

Second nanofiltration of hydrolyzed skim milk. Feed, retentate and permeate compositions.

| Composition | Feed (NF permeate I) | NF retentate II | NF permeate II |
|---|---|---|---|
| Dry matter (%) | 4.6 | 15.9 | 0.5 |
| Glucose (%) | 1.8 | 7.5 | 0.2 |
| Galactose (%) | 1.7 | 7.1 | 0.2 |
| Ash (%) | 0.3 | 0.6 | 0.2 |

The first-phase retentate (NF retentate I; table 4) and the second-phase permeate (NF permeate II; table 5) were used in composing a milk (example 8). The NF retentate I was also used in composing a milk containing whey protein (example 10).

Example 4: Two-Phase Nanofiltration of Hydrolyzed Skim Milk (Membranes Desal 5 DL (K=1.5) and Filmtec NF (K=6))

The lactose of skim milk was hydrolyzed like in example 3. The first phase of the phased nanofiltration of the hydrolyzed skim milk was performed at 50° C. like in example 3, except that the concentration factor was 1.5. The NF permeate I obtained in the first phase was nanofiltered in the second phase at 10 to 25° C. with a concentration factor 6 to recover the minerals, as is described in example 3.

Protein, dry matter, glucose, galactose and ash and calcium were determined on the basis of the feed (hydrolyzed skim milk), NF retentate I and NF permeate I of the first nanofiltration phase (table 6). Dry matter, glucose, galactose and ash were determined on the basis of the feed (NF permeate I), NF retentate II and NF permeate II of the second nanofiltration phase (table 7).

Sugars and minerals in the NF retentate II were separated from one another by chromatography, which will be described in example 5.

TABLE 6

First nanofiltration of hydrolyzed skim milk.
Feed, retentate and permeate compositions.

| Composition | Feed (hydrolyzed skim milk) | NF retentate I | NF permeate I |
|---|---|---|---|
| Protein (%) | 3.4 | 5.0 | 0.1 |
| Ash (%) | 0.7 | 1.0 | 0.3 |
| Calcium (mg/kg) | 1100 | 1700 | 38 |
| Dry matter (%) | 8.9 | 11.1 | 4.3 |
| Glucose (%) | 2.3 | 2.3 | 1.8 |
| Galactose (%) | 2.2 | 2.3 | 1.7 |
| Ca/protein (g/kg) | 35.1 | 34.3 | |

TABLE 7

Second nanofiltration of hydrolyzed skim milk.
Feed, retentate and permeate compositions.

| Composition | Feed (NF permeate I) | NF retentate II | NF permeate II |
|---|---|---|---|
| Dry matter (%) | 4.3 | 16.1 | 0.5 |
| Glucose (%) | 1.8 | 7.6 | 0.2 |
| Galactose (%) | 1.7 | 7.1 | 0.2 |
| Ash (%) | 0.3 | 0.6 | 0.2 |

The first-phase retentate (NF retentate I) (table 6) and the second-phase permeate (NF permeate II) were used in composing a milk (example 7).

Example 5: Recovery of Minerals from Concentrated Nanofiltration Permeate

The concentrated NF permeate of hydrolyzed skim milk, i.e. the retentate of the second nanofiltration phase (NF retentate II), was further processed in a chromatography column in order to separate the mineral fraction and the sugar fraction.

Figure 1A:
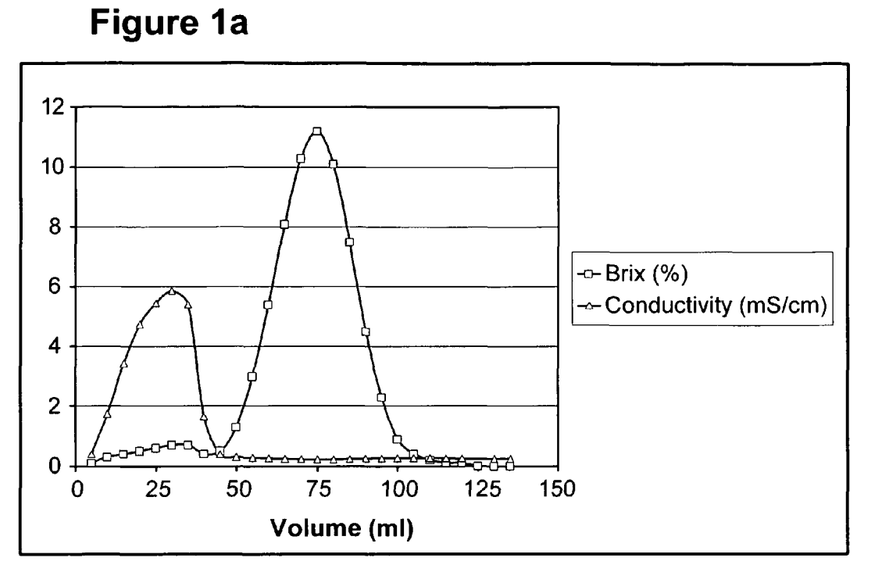
FIG. 1a shows chromatographic separation of a mineral-sugar fraction at 65° C. (Finex CS09GC resin, flow rate 160 ml/h, feed 20 ml, NF retentate of the second nanofiltration, °Brix 16%).
Figure 1B:
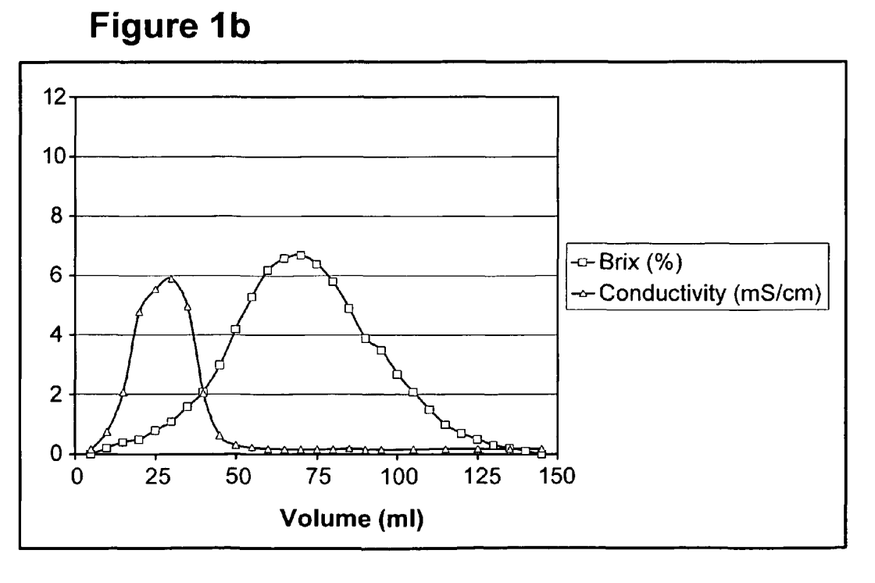
FIG. 1b shows chromatographic separation of a mineral-sugar fraction at 10° C. (Finex CS09GC resin, flow rate 160 ml/h, feed 20 ml, NF retentate of the second nanofiltration, Brix °16%).

A cation-exchange resin (Finex CS 09 GC, Finex Oy, Finland, Na form) was mixed with skim milk (1 liter/50 ml of resin) for 30 minutes. The skim milk was flushed clean from the resin with ion-exchanged water. The balanced resin (180 to 200 ml) was packed in a column with a heating jacket (height 100 cm, diameter 1.5 cm) at 65° C. 20 ml of NF retentate concentrate (NF retentate II) was fed into the column (°Brix about 16; example 4). The flow rate was 160 ml/h, the temperature 65° C., and tap water was used as an eluant. Fractions of 5 ml were collected and combined into two fractions: a mineral fraction and a sugar fraction. A similar separation was also performed at 10° C.

Ash, galactose and glucose were determined on the basis of the fractions.

In practice, a complete separation of the milk minerals and the monosaccharides in the concentrated NF permeate (NF retentate II) of skim milk was achieved (tables 8 and 9). The sugars were separated more efficiently at a temperature of 65° C.

The mineral fraction separated at a temperature of 65° C. (fractions 0 to 50; table 8) was used in composing the lactose-free milk (example 7).

TABLE 8

°Brix and conductivity of fractions separated by chromatography from concentrated NF permeate of skim milk

| Feed °Brix (%) | Temperature (° C.) | Fractions (ml) | °Brix (%) | Conductivity (mS/cm) |
|---|---|---|---|---|
| 16 | 65 | 0 to 50 | 0.6 | 2.98 |
|  |  | 50 to 100 | 6.4 | 0.236 |
| 16 | 10 | 0 to 50 | 1.6 | 2.98 |
|  |  | 50 to 100 | 5.5 | 0.159 |

TABLE 9

Galactose, glucose and ash content of fractions separated by chromatography from concentrated NF permeate of skim milk

| Feed °Brix (%) | Temperature (° C.) | Fractions (ml) | Galactose (%) | Glucose (%) | Ash (%) |
|---|---|---|---|---|---|
| 16 | 65 | 0 to 50 | 0.02 | 0.13 | 0.22 |
| 16 | 10 | 0 to 50 | 0.28 | 0.78 | 0.23 |

Example 6: Composing of Lactose-Free Milk from Nanofiltration Retentate and RO Retentate of Hydrolyzed Skim Milk A lactose-free milk was composed of the NF retentate II and RO retentate I of the hydrolyzed skim milk of example 2. The compositions and proportions of the fractions in the composite as well as the composition of the lactose-free milk are shown in table 10. The composition of the lactose-free skim milk corresponds to that of normal milk, except for carbohydrates.

TABLE 10

Composing of lactose-free skim milk from NF retentate and RO retentate of hydrolyzed skim milk

| | NF retentate II (example 2) | RO retentate I (example 2) | Lactose-free skim milk |
|---|---|---|---|
| Proportion (%) | 50 | 50 | |
| Composition | | | |
| Protein (%) | 6.4 | 0.2 | 3.3 |
| Glucose (%) | 3.1 | 0.2 | 1.7 |
| Galactose (%) | 3.1 | 0.2 | 1.6 |
| Ash (%) | 1.1 | 0.2 | 0.7 |
| Dry matter (%) | 14.4 | 0.7 | 7.5 |
| Calcium (mg/kg) | 2100 | — | 1100 |
| Magnesium (mg/kg) | 200 | <10 | 100 |

Example 7: Composing of Lactose-Free Milk from Nanofiltration and Chromatography Fractions of Hydrolyzed Skim Milk A lactose-free milk drink composed of the fractions of examples 4 and 5, i.e. the retentate of the first nanofiltration of hydrolyzed skim milk (NF retentate I), the NF permeate of the NF permeate derived from the first nanofiltration (NF permeate II), and the mineral fraction separated by chromatography from the NF retentate of the second nanofiltration. The compositions and proportions of the fractions in the composed milk as well as the composition of the composed product are shown in table 11. (The liquid contained in the lactose-free milk is derived from the process, and water need not be added separately.)

In addition, a lactose-free milk was composed as in the above, except that instead of the mineral fraction separated by chromatography, water was added (table 12). Instead of water, an RO permeate fraction obtained from reverse osmosis may be used.

Except for carbohydrates, the composition of the milks corresponded to that of the hydrolyzed milk entirely. The amount of calcium (1100 mg/kg) was exactly the same as in the original milk. The products were also assessed organoleptically, and they were considered to have good properties and to taste like common skim milk.

TABLE 11

Composing of lactose-free milk from NF retentate I, NF permeate II and mineral fraction from chromatography. Compositions of fractions and product, and proportion of fractions.

|  | NF retentate I (example 4) | NF permeate II (example 4) | Mineral fraction from chromatography (example 5) | Lactose-free skim milk |
|---|---|---|---|---|
| Proportion (%) | 66.6 | 27.7 | 5.7 |  |
| Composition |  |  |  |  |
| Protein (%) | 5.0 | — | 0 | 3.3 |
| Glucose (%) | 2.3 | 0.2 | 0.1 | 1.6 |
| Galactose (%) | 2.3 | 0.2 | <0.1 | 1.6 |
| Ash (%) | 1.0 | 0.2 | 0.2 | 0.7 |
| Dry matter (%) | 8.8 | 0.5 |  | 7.5 |
| Calcium (mg/kg) | 1700 | 12 | — | 1100 |

TABLE 12

Composing of lactose-free milk from NF retentate I, NF permeate II and water. Compositions of fractions and product, and proportion of fractions.

|  | NF retentate I (example 4) | NF permeate II (example 4) | Water | Lactose-free skim milk |
|---|---|---|---|---|
| Proportion (%) | 66.6 | 27.7 | 5.7 |  |
| Composition |  |  |  |  |
| Protein (%) | 5.0 | — | 0 | 3.3 |
| Glucose (%) | 2.3 | 0.2 | 0 | 1.6 |
| Galactose (%) | 2.3 | 0.2 | 0 | 1.6 |
| Ash (%) | 1.0 | 0.2 | 0 | 0.7 |
| Dry matter (%) | 8.8 | 0.5 | 0 | 7.5 |
| Calcium (mg/kg) | 1700 | 12 | 0 | 1100 |

Example 8: Composing of Low-Lactose, Lactose-Free and Low-Carbohydrate Milks from Nanofiltration Fractions of Hydrolyzed Skim Milk The low-lactose, lactose-free and low-carbohydrate milks according to the invention were composed of the fractions of example 3, i.e. the NF retentate I and the NF permeate II. In addition, hydrolyzed skim milk was used in composing a lactose-free milk (table 13), and skim milk in composing a low-lactose, protein- and calcium-enriched milk (table 14). A low-carbohydrate lactose-free milk was composed of the NF fractions only (table 15). The compositions and proportions of the fractions in the composed milks as well as the composition of the product are shown in tables 13 to 15.

TABLE 13

Composing of lactose-free milk from nanofiltration fractions, having the composition of a product corresponding to normal milk.

|  | NF retentate I (example 3) | Hydrolyzed skim milk | NF permeate II (example 3) | Lactose-free skim milk |
|---|---|---|---|---|
| Proportion (%) | 21.3 | 43.2 | 35.4 |  |
| Composition |  |  |  |  |
| Protein (%) | 8.5 | 3.3 | — | 3.3 |
| Glucose (%) | 2.5 | 2.3 | 0.2 | 1.6 |
| Galactose (%) | 2.5 | 2.2 | 0.2 | 1.6 |
| Ash (%) | 1.4 | 0.7 | 0.2 | 0.7 |
| Dry matter (%) | 15.7 | 8.8 | 0.5 | 7.3 |
| Calcium (mg/kg) | 2900 | 1100 | 10 | 1100 |

Except for carbohydrates, the composition of the lactose-free skim milk described in table 13 corresponded to that of the hydrolyzed milk entirely. What is noteworthy is that the amount of calcium was exactly the same as in the original milk. The product was also assessed organoleptically, and it was considered to be good and taste like normal skim milk.

TABLE 14

Composing of low-lactose protein- and calcium-enriched milk

|  | NF retentate I (example 3) | Skim milk | NF permeate II (example 3) | Protein-containing milk rich in calcium |
|---|---|---|---|---|
| Proportion (%) | 47.0 | 12.2 | 40.8 |  |
| Composition |  |  |  |  |
| Protein (%) | 8.5 | 3.3 | — | 4.4 |
| Lactose (%) | <0.01 | 4.7 | <0.01 | 0.6 |
| Glucose (%) | 2.5 | 0 | 0.2 | 1.3 |
| Galactose (%) | 2.5 | 0 | 0.2 | 1.3 |
| Ash (%) | 1.4 | 0.7 | 0.2 | 0.8 |
| Dry matter (%) | 15.7 | 8.8 | 0.5 | 8.6 |
| Calcium (mg/kg) | 2900 | 1100 | 10 | 1500 |

The milk described in table 14 has a protein content that is considerably higher than in normal milk, but the amount of monosaccharides is at a level, the sweetness of which corresponds to normal milk. In an organoleptic test it was observed that the milk tasted richer than normal skim milk but otherwise the taste was the same as in normal milk.

TABLE 15

Composing of low-carbohydrate lactose-free milk

|  | NF retentate I (example 3) | NF permeate II (example 3) | Low-carbohydrate lactose-free milk |
|---|---|---|---|
| Proportion (%) | 38.9 | 61.1 |  |
| Composition |  |  |  |
| Protein (%) | 8.5 | — | 3.3 |
| Glucose (%) | 2.5 | 0.2 | 1.1 |
| Galactose (%) | 2.5 | 0.2 | 1.1 |
| Ash (%) | 1.4 | 0.2 | 0.7 |
| Dry matter (%) | 15.7 | 0.5 | 6.4 |
| Calcium (mg/kg) | 2900 | 10 | 1100 |

The product described in table 15 had a similar composition as normal milk, but there was no lactose, and the amounts of glucose and galactose were very small. Despite its composition, the milk was unexpectedly rich in taste although it was not as sweet as normal milk.

Example 9: Single-Phase Nanofiltration of Hydrolyzed Whey with Desal 5 DL Membrane (K=7)

Skimmed whey (40 l) was hydrolyzed (9° C., 20 h) with Godo YNL2 lactase (Godo Shusei Company, Japan) with a dosage of 0.1%, and nanofiltered with a Desal 5 DL membrane (GE Osmonics, USA) at a temperature of 46 to 51° C. and a pressure of 3 to 6.5 bar. The permeate flow was 10.0 to 13.5 l/m²h. The nanofiltration was continued until the concentration factor was 7, the retentate volume 5.5 l and the permeate volume 34.5 l.

Samples were taken from the feed (hydrolyzed whey), retentate and permeate, and protein, dry matter, glucose, galactose, ash, and calcium were determined on the basis of the samples (table 16).

TABLE 16

First nanofiltration of hydrolyzed whey, Feed, retentate and permeate compositions.

| Composition | Feed (hydrolyzed whey) | NF retentate I | NF permeate I |
|---|---|---|---|
| Protein (%) | 0.6 | 4.6 | — |
| Ash (%) | 0.3 | 1.5 | 0.3 |
| Calcium (mg/kg) | 400 | 2700 | 80 |
| Dry matter (%) | 5.0 | 10.2 | 4.1 |
| Glucose (%) | 2.2 | 2.7 | 2.0 |
| Galactose (%) | 1.9 | 2.7 | 1.8 |
| Ca/protein (g/kg) | 59.0 | 58.8 | — |

The composition of the NF permeate I separated from the hydrolyzed whey corresponded to the NF permeate separated from the hydrolyzed skim milk in corresponding conditions (example 3, table 4). If desired, the nanofiltration of whey can be continued in the second phase in the same way as in example 3.

The NF retentate I was used in composing the milk (example 10).

Example 10: Composing of Lactose-Free Milk Containing Whey Protein from Nanofiltration Fractions of Hydrolyzed Whey and Skim Milk A lactose-free milk containing whey protein was composed of the NF retentate I of the hydrolyzed whey of example 9, the NF retentate I of the hydrolyzed skim milk of example 3, hydrolyzed skim milk, and the RO permeate obtained in example 2. The compositions and proportions of the fractions in the composite as well as the composition of the lactose-free milk containing whey protein are shown in table 17. The lactose-free milk containing whey protein contained less carbohydrates and more calcium than normal milk, as well as whey protein, the proportion of which in the proteins of the milk is 40%.

TABLE 17

Composing of lactose-free skim milk containing whey protein from nanofiltration fractions and skim milk

| | NF retentate I (milk, example 3) | NF retentate I (whey, example 9) | Hydrolyzed skim milk | RO permeate | Lactose-free skim milk containing whey protein |
|---|---|---|---|---|---|
| Proportion (%) | 12.7 | 18.7 | 40.2 | 28.4 | |
| Composition | | | | | |
| Protein (%) | 8.5 | 4.6 | 3.4 | 0 | 3.3 |
| Glucose (%) | 2.5 | 2.0 | 2.3 | 0 | 1.6 |
| Galactose (%) | 2.5 | 1.8 | 2.2 | <0.1 | 1.6 |
| Ash (%) | 1.4 | 1.5 | 0.8 | <0.1 | 0.8 |
| Calcium (mg/kg) | 2900 | 2700 | 1100 | — | 1300 |
| Dry matter (%) | 15.7 | 10.2 | 8.8 | >0.1 | 7.4 |

The invention claimed is:

1. A lactose-free or low-lactose milk product with a ratio of ash to protein of about 0.2 by weight and protein and calcium contents similar to or higher than those of milk raw material comprising a nanofiltration retentate fraction rich in protein of a lactose-hydrolyzed milk raw material, and a nanofiltration permeate fraction containing milk minerals of a nanofiltration permeate of a lactose-hydrolyzed milk raw material.

2. A process for the production of a lactose-free or low-lactose milk product, the process comprising
   a) hydrolyzing the lactose of a milk raw material, thus obtaining hydrolyzed milk raw material,
   b) performing a first nanofiltration on the hydrolyzed milk raw material to separate sugars and minerals into a first nanofiltration permeate and protein into a first nanofiltration retentate,
   c) performing a second nanofiltration on the first nanofiltration permeate to separate sugars into a second nanofiltration retentate and minerals into a second nanofiltration permeate, wherein the temperature, pressure, type of membrane and/or concentration factor employed in nanofiltration step b) differ from temperature, pressure, type of membrane and/or concentration factor employed in nanofiltration step c),
   d) composing a lactose-free or low-lactose milk product with protein and calcium contents similar to or higher than those of the milk raw material from the first nanofiltration retentate from step b) and the second nanofiltration permeate from step c),
   e) if desired, concentrating the product obtained from step d) to a concentrate or a powder.

3. The process as claimed in claim 2, wherein the lactose of the milk raw material is hydrolyzed partially.

4. The process as claimed in claim 3, wherein the residual lactose of the partially hydrolyzed milk raw material is post-hydrolyzed, essentially in the nanofiltration steps b) and c).

5. The process as claimed in claim 2, wherein the nanofiltration retentate from step c) is subjected to chromatographic separation to separate minerals from sugars, and the minerals are used in step d) to compose the lactose-free or low-lactose milk product.

6. The process as claimed in claim 2, wherein the content of calcium of the lactose-free or low-lactose milk product is at least 1100 mg/kg milk product.

7. The process as claimed in claim 2, wherein the first nanofiltration is performed in warm conditions, at approximately 25 to 50° C., and the second nanofiltration is performed in cold conditions, at approximately 5 to 25° C.

8. The milk product as claimed in claim 1, wherein the nanofiltration permeate is provided in a concentrated form as a reverse osmosis retentate obtained by reverse osmosis.

9. The milk product as claimed in claim 1, further comprising minerals obtained from chromatographic separation of a nanofiltration retentate fraction of the hydrolyzed milk raw material, mainly containing sugars and minerals.

10. The process as claimed in claim 2, wherein the first nanofiltration is performed by means of diafiltration.

11. The process as claimed in claim 2, wherein the second nanofiltration permeate is concentrated by reverse osmosis to provide a reverse osmosis retentate which is used in step d) to compose the lactose-free or low-lactose milk product.

12. The process as claimed in claim 2, wherein the lactose-free or low-lactose milk product has a ratio of ash to protein of about 0.2 by weight.

* * * * *